Figure 9:
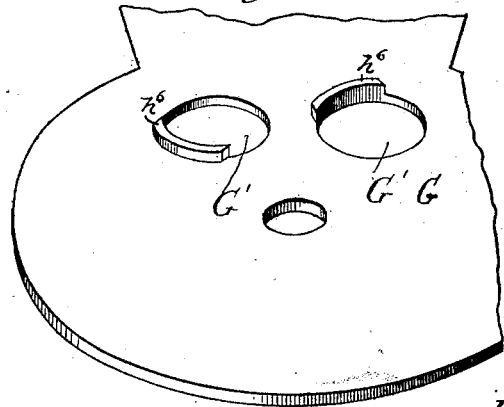

(No Model.) 3 Sheets—Sheet 1.
L. EBERHART & I. D. STEVENS.
SEEDING MACHINE.
No. 340,563. Patented Apr. 27, 1886.
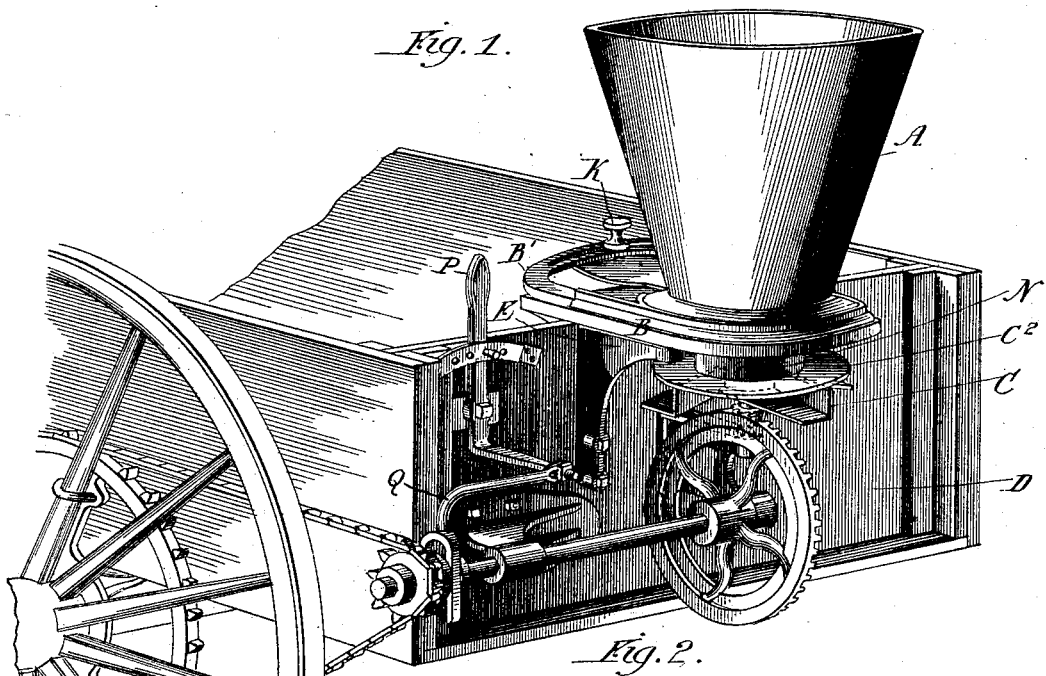
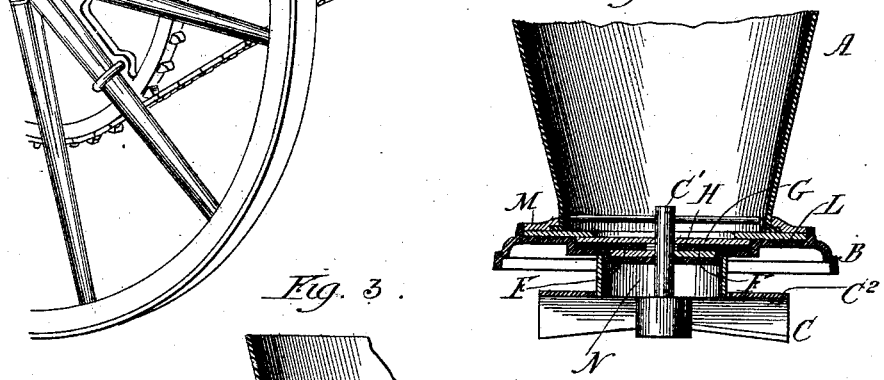
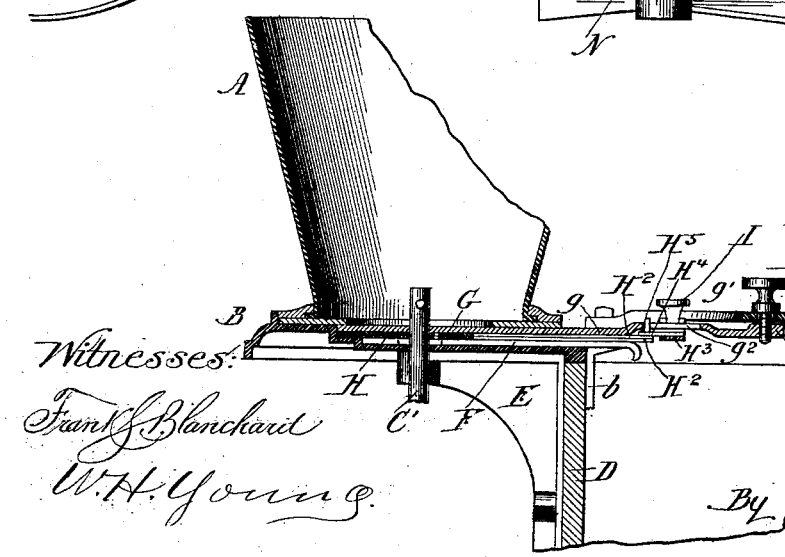
Witnesses:
Frank J. Blanchard
W. H. Young
Inventor:
Lloyd Eberhart
Irving D. Stevens
By Chas. G. Page
Attorney (No Model.) 3 Sheets—Sheet 2.
L. EBERHART & I. D. STEVENS.
SEEDING MACHINE.
No. 340,563. Patented Apr. 27, 1886.
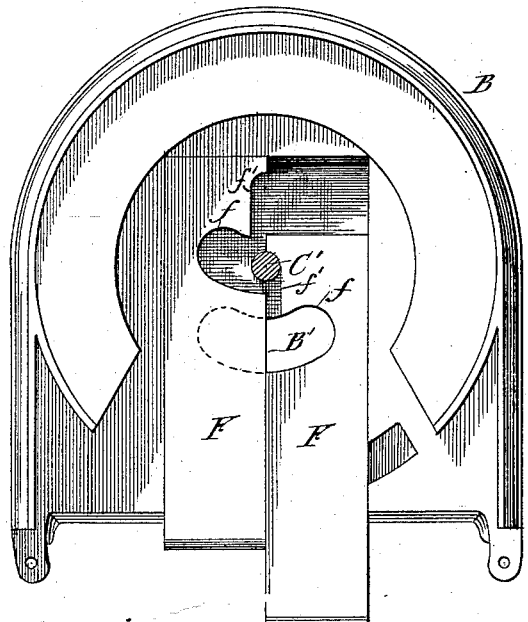
Fig. 4.
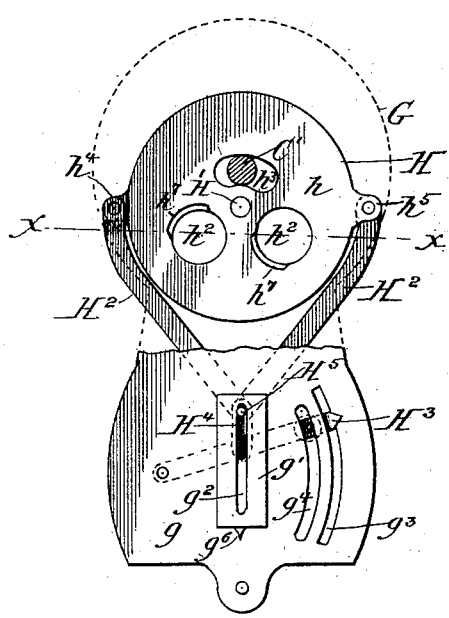
Fig. 6.
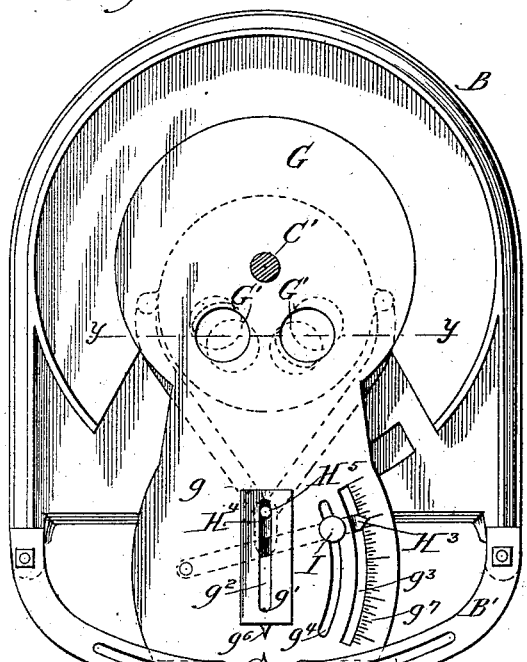
Fig. 5.
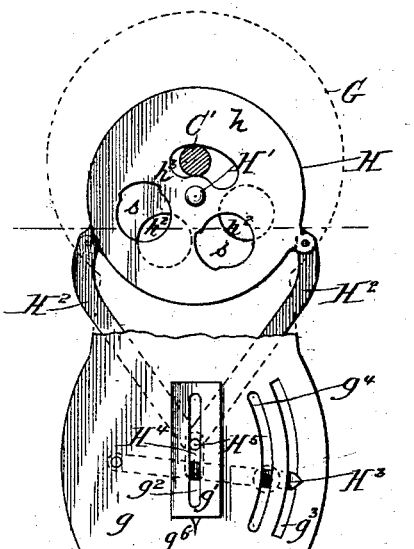
Fig. 7.
Fig. 8.
Witnesses:
Frank J. Blanchard
W. H. Young
Inventor:
Lloyd Eberhart
Irving D. Stevens
By Chas. S. Page
Attorney (No Model.) 3 Sheets—Sheet 3.

L. EBERHART & I. D. STEVENS.
SEEDING MACHINE.

No. 340,563. Patented Apr. 27, 1886.

Witnesses:
Frank J. Blanchard
W. H. Young

Inventor:
Lloyd Eberhart
Irving D. Stevens
By Chas. G. Page
Attorney

UNITED STATES PATENT OFFICE.

LLOYD EBERHART AND IRVING D. STEVENS, OF JOLIET, ILLINOIS.

SEEDING-MACHINE.

SPECIFICATION forming part of Letters Patent No. 340,563, dated April 27, 1886.

Application filed July 23, 1885. Serial No. 172,363. (No model.)

*To all whom it may concern:*

Be it known that we, LLOYD EBERHART and IRVING D. STEVENS, both citizens of the United States, residing at Joliet, in the county of Will and State of Illinois, have invented certain new and useful Improvements in Seeding-Machines, of which the following is a specification.

This invention is more especially applicable to that class of seeding-machines commonly known as "broadcast-sowers," wherein a rotary seed-distributing fan is arranged below a hopper at the rear end of a wagon and driven from one of the hind wheels, through the medium of suitable power-transmitting devices.

The seeding-machine herein illustrated is in some respects similar to and designed to do the work of the seeding-machine shown in Letters Patent No. 332,506, granted to one of the present applicants on or about April 22, 1885, our present improvement being especially applicable to and serviceable in a machine of such character. It is, however, understood that our improvement may be applied to other seeding-machines having a construction wherein our said improvement, hereinafter particularly described, may be of advantage.

The object of our invention is to provide a novel construction of valve for regulating the quantity of seed or fertilizer discharged from the hopper, irrespective of the point at which the discharge occurs; to cause the discharge-openings or seed-passages leading from the hopper to be contracted uniformly, or substantially so, toward their respective centers when it is desired to lessen the quantity of the discharge; to provide simple and efficient means for operating the valve and for determining the position of the valve relative to the discharge-openings of the hopper; to avoid the employment of brace-rods at either side of the rotary seed-distributing fan as a means for upholding the hopper-base, and to support the latter upon the end-gate of a wagon in a manner to leave a clear field for the cast of seed; to provide means for preventing seed or fertilizing material passing from the hopper-base to the rotary distributing-fan and falling upon the latter from being blown about either on its way to the fan or while being carried round with the fan to the point of cast, and, finally, to provide certain novel and improved details of construction.

To these and other ends our invention consists in the several matters hereinafter described, and particularly pointed out in the claims.

Figure 10:
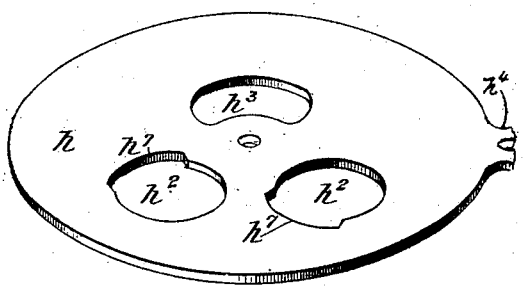
Figure 11:
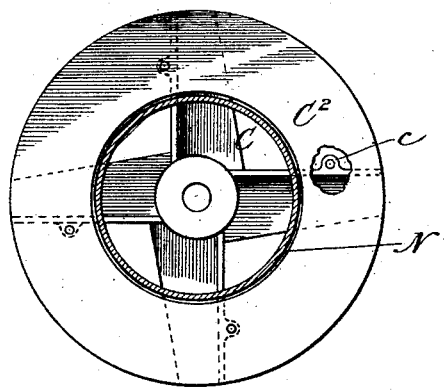
Figure 12:
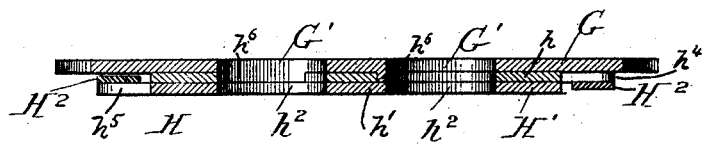

In the drawings, Figure 1 represents in perspective a seeding apparatus embodying the principles of our invention and arranged at the rear end of a wagon. Fig. 2 is a transverse vertical section, with the supports for the hopper-base omitted. Fig. 3 is a longitudinal vertical section through the hopper and its supports, and through the devices for controlling the discharge and for varying or shifting the point at which the discharge is made. Fig. 4 is a top plan view, on a somewhat larger scale of the plate adapted to serve as a base for the hopper, with all of the appendages removed, except a pair of slides employed for opening and closing the discharge passage, which is formed through the said base-plate, one of the slides being in position to open one half of the discharge-passage, and the other slide being in position to close the remaining half of the discharge-passage. Fig. 5 is a top plan view of the base-plate and the oscillatory adjustable hopper-bottom, which latter is fitted to turn over the slides shown in the preceding figure, the double valve, which is attached to the bottom side of the oscillatory adjustable hopper-bottom, and the devices for operating said valve being shown in dotted lines. Fig. 6 is a top plan view of the extension portion of the rotary adjustable hopper-bottom, with the remaining portion thereof, which forms the hopper-bottom proper, broken away and indicated in dotted lines, so as to expose the double valve and a part of the devices employed for operating the same. In this view the apertures of one of the valve-plates are in register with the apertures of the remaining valve-plate, and these coinciding apertures are understood to be in register with the apertures of the oscillatory adjustable hopper-bottom, so as to open the same to the fullest extent. Fig. 7 is a view similar to Fig. 6, but with the valve-plates in adjustment about their common axis to bring the apertures of one valve-plate nearly out of register with the apertures of the remaining valve-plate, so as to contract the apertures or passages through the oscillatory adjustable hopper-bottom. Fig. 8 is a transverse section on the line x x, Fig. 6, showing a portion of the oscillatory adjustable hopper-bottom. Fig. 9 shows in perspective a portion of the hopper-bottom upside down. Fig. 10 is a perspective view of the top valve-plate. Fig. 11 is a top plan of the rotary distributing-fan. Fig. 12 is a section on line y y, Fig. 5, through the hopper-bottom and double valve.

In the annexed drawings, A indicates the hopper, which is secured upon and supported by an appropriate base, B, consisting of a metal frame or plate formed to receive the devices herein employed for regulating the flow of seed or fertilizing material, and for determining the point at which it is desirable to discharge upon a rotary distributing-fan, C, arranged to operate below the hopper. The base-plate B is usually adapted to be and, as herein shown, is supported upon a frame or board, D, desirably formed to serve as the end-gate of a wagon, as in Fig. 1.

As a means for securing this base-plate upon the end-gate board, the base-plate is provided at or near one end with a pair of depending lugs, b, Fig. 3, which fit against the forward side of the end-gate board when the base-plate is rested upon the top edge of the latter. The base-plate is rigidly held in a horizontal position upon the end-gate board by means of brackets E, bolted against the rear side of the end-gate board, and affording seats upon which the base-plate will be secured by bolts or other analogous fastening devices. By such arrangement the employment of inclined brace-rods arranged at opposite sides of the distributing-fan, and heretofore used to uphold a platform for the hopper, is avoided, and hence at and about the rear end of the wagon a clear field is provided for the cast or throw of seed from the rotary distributer. The upright spindle C' of the rotary distributing-fan extends up through the base-plate B and enter the hopper, within which latter the spindle is usually provided with some device suitable for agitating the seed or fertilizing material. At a point preferably forward of the rotary distributing-fan spindle the base-plate is provided with a curved slot, B', Fig. 4, constituting a discharge-passage, which is desirably formed on a curve concentric with the axis of the said spindle, and at a point directly over the rotary distributing-fan. This discharge-passage through the base-plate can be opened or closed, either partially or entirely, by means of a pair of horizontally-arranged and independently-movable slides, F F, consisting of plates which are countersunk in the base-plate and arranged to slide freely over the discharge-passage. Each one of these slides is provided with a notch, f, equal or about equal to one-half the area of the discharge-passage B'. Either slide can be drawn forward to bring its notch into register with the discharge-passage, so as to open one or the other half of the latter, or both slides can be adjusted so as to entirely open the said discharge-passage, while, on the other hand, both slides can be adjusted so as to entirely close the discharge-passage. These slides are also notched or cut away along their opposing edges, as at f', in order to provide space for the rotary distributing-fan spindle and permit the slides to be adjusted back and forth.

The foregoing feature of the notched or slotted slides operative over the discharge-passage is embraced in the application hereinbefore referred to, but is shown in the present instance as being a simple and efficient means for opening and closing, either partially or entirely, the discharge-passage, it being understood that by such means the end portion or half of the discharge-passage B', which is in position to discharge upon the rotary distributing-fan at a point nearest moment of cast, may be opened, or that such portion of the discharge-passage can be closed and the other portion thereof, which is in position to discharge farther back from the moment of cast, can be opened, in which way a half-cast at either side can be made, as desired.

G indicates a horizontally-disposed circular-shaped plate, which is arranged to oscillate over the slides F and about the rotary distributing-fan spindle. This plate constitutes an adjustable bottom for the hopper, and is provided with a pair of ports or apertures, G', (see especially Figs. 5 and 9,) which are preferably circular, and located so as to come over the curved discharge-passage B² of the base-plate. By adjusting the slides F, or other devices which may be employed to subserve the functions of said slides, a passage can be established from either or both of the apertures in the oscillatory adjustable hopper-bottom, so that either or both of these apertures can be called into service as occasion may require.

The point at which seed is permitted to discharge from the hopper onto the rotary distributing-fan can be shifted by adjusting the hopper-bottom about its axis and setting the slides so as to open the discharge-passage B² below either or both of the hopper-bottom apertures, as may be required. Thus, for example, by turning the hopper-bottom in one direction seed can be discharged onto the rotary distributing-fan near the point or moment of cast, while by turning the hopper-bottom in a reverse direction the seed will be discharged onto the rotary distributing-fan farther back from the point or moment of cast, it being understood that seed of varying weight is discharged or thrown off from the rotary distributing fan more or less quickly, and hence that it is desirable to shift the point from which seed is discharged onto the rotary distributing-fan with reference to the point or moment at which it is desired the cast shall commence. The slides are conveniently sunk in the base-plate sufficiently below the plane of the oscillatory adjustable hopper-bottom to afford working space between said hopper-bottom and the slides for a double valve, H, which is attached to the under side of the hopper bottom and adapted to serve as a means for varying the area of the hopper-bottom apertures G' with reference to the kind or quantity of seed to be sown. This double valve consists of a pair of plates, $h$ and $h'$, preferably circular, and each provided with two ports or apertures, $h^2$, corresponding to the apertures of the oscillatory adjustable hopper-bottom. These two double-apertured valve-plates are placed one upon the other, and both pivoted to the under side of the adjustable hopper-bottom by means of a pivot, H', Figs. 6 and 7, which is common to both valve-plates, and which serves as an axis about which the valve-plates can be turned independently of each other. It may be observed that substantially the same result could be attained by employing the rotary fan-spindle as a pivot for the valve-plates, and providing in any suitable way a connection between the valve-plates and the rotary adjustable hopper-bottom which would permit the valve-plates to be turned independently of the hopper-bottom, and at the same time permit their apertures to be brought into register with the hopper-bottom apertures; but the arrangement herein shown of pivoting the valve-plates to the rotary adjustable hopper-bottom is regarded as the most desirable one of the two. The pivot H' is set at one side of and eccentric to the fan-spindle C', which latter extends up through a curved slot, $h^3$, formed through each one of the valve-plates, this slot being of sufficient length to admit of a rotary adjustment to the required extent in either direction on the part of each one of the valve-plates. The apertures of the valve-plates correspond in size to those of the oscillatory adjustable hopper-bottom, and are arranged so that when the apertures of one valve-plate are in register or coincidence with those of the other valve plate the said coinciding apertures will register with the apertures of the oscillatory adjustable hopper-bottom. The two valve-plates are also arranged to be turned simultaneously in opposite directions about their common pivot, so that the apertures of one valve-plate can be moved out of register with the apertures of the remaining valve-plate to any desired extent, and thereby the apertures of the hopper-bottom be contracted or closed, according to the extent to which the valve-plates are turned about their pivot. This feature is illustrated by Figs. 6 and 7, Fig. 6 showing the apertures of one valve-plate in exact coincidence with the apertures of the other valve-plate, so as to bring the double valve into a condition to open the apertures of the hopper-bottom to the fullest extent, and Fig. 7 showing the apertures of one valve-plate somewhat out of coincidence with relation to those of the other and to the apertures of the hopper-bottom, so as to contract the apertures of the latter.

It will be evident that when the valve-plates are respectively turned in opposite directions from the position shown in Fig. 6 their openings will be moved out of register, so that the apertures of the adjustable hopper-bottom will be practically contracted in proportion to the extent to which the ports of the double valve are contracted and the imperforate portions of the valve-plates brought under the apertures G' of the hopper-bottom.

By employing the two double-apertured valve-plates and turning them simultaneously in opposite directions the discharge-openings through the adjustable hopper-bottom are contracted toward and opened from their centers, and hence the partial closing of said hopper-bottom apertures from one side only, as would be liable to occur in case but one valve-plate were employed, will be avoided. The hopper-bottom carrying these two valve-plates can be turned about the axis of the fan-spindle in either direction, for purposes hereinbefore mentioned, and during such rotary adjustment on the part of the adjustable hopper-bottom the relative position thereto of the double valve will be maintained, so that whenever the double valve is operated to contract the apertures of the hopper-bottom the centers of said apertures, irrespective of their degree of contraction, will be at about the same distance from the axis of the fan-spindle, and thus discharge the seed upon the fan at a proper distance from the center of the same.

As shown in Figs. 9 and 12, the hopper-bottom is provided on its under side with two part-circular ribs or flanges, $h^6$, each arranged alongside one of the apertures G', and, as shown in Figs. 6, 7, and 10, the top valve-plate is provided with two notches, $h^7$, each formed along the edge of one of its two apertures $h^2$. The notches $h^7$ of the upper valve-plate are adapted and arranged to receive the curved ribs $h^6$ of the hopper-bottom when the apertures of the valve-plate are in register with the apertures of the hopper-bottom, in which way the ribs set back in the notches, and thus permit the apertures of the hopper-bottom to be opened to the fullest extent, as in full lines, Fig. 5. The ribs extend down into but not below the top valve-plate, so as not to interfere with the free working of the lower valve-plate, and are designed to prevent seed from passing and wedging between the hopper-bottom and the lower one of the two valve-plates, when the latter are in position to contract the apertures of the hopper-bottom—as, for example, assuming the valve-plates, which have been in position to open the hopper-bottom apertures to the fullest extent, to be turned, respectively, in opposite directions, so as to contract the said apertures. Under such conditions the upper valve-plate will be turned so as to cause its notches $h^7$ to leave the ribs of the hopper-bottom, while the lower valve-plate will be turned to an equal extent in an opposite direction. The hopper-bottom apertures being thus contracted by the adjustment of the valve-plates—for instance, as in Fig. 7—the ribs extending down into the apertures of the upper valve-plate will lie at one side of the contracted ports or passages through the double valve, and serve as guards for preventing seed from finding its way into the space left between the lower valve-plate and the hopper-bottom at a point adjacent to each contracted port or passage, which is thus temporarily provided through the double valve, it being evident that when certain portions of the apertures of the upper valve-plate are directly under the hopper-bottom at one side of the apertures of the latter, spaces, as at $s$ $s$, Fig. 7, are left between the hopper-bottom and the lower valve-plate at such points, which spaces would form passages lateral to the line of discharge from the hopper through the valve, unless the ribs were employed to form guards to close or cut off the same from the proper discharge-passage.

As a means for operating the double valve, each oscillatory plate thereof is connected with one of two reciprocatory links or pitmen, $H^2$, arranged to connect the valve-plates with a vibratory valve-operating lever, $H^3$, which is pivoted at one of its ends to an extension, $g$, of the oscillatory adjustable hopper-bottom. The links or pitmen connect with the double valve respectively at opposite sides of the pivot about which the valve-plates oscillate, one link being pivotally attached to a perforated lug or ear, $h^4$, on the upper valve-plate, $h$, and the other link being similarly attached to a like lug or ear, $h^5$, on the lower valve-plate, in which way a vibratory movement on the part of the lever $H^3$ will simultaneously operate the valve-plates in opposite directions, respectively, whereby the lever can be adjusted so as to simultaneously adjust the valve-plates, and thus regulate the area of the apertures or seed-passages through the adjustable hopper-bottom. The two links preferably converge from the double valve toward the lever, and at their converging ends are pivoted to a short link, $H^4$, which is in turn pivoted to the lever and fitted to slide in a guideway formed by a raised or struck-up portion, $g'$, of the hopper-bottom extension $g$.

In order to further guide and steady the link $H^4$, the pivot $H^5$, which connects the same with the links or pitmen $H^2$, is extended up through a slot, $g^2$, formed longitudinally through the raised portion of the adjustable hopper-bottom extension. The free end of the vibratory lever is turned up, so as to extend through a curved slot, $g^3$, formed through the hopper-bottom extension, and a graduated scale, $g^7$, is placed alongside said slot, so as to serve, in conjunction with the lever, as a means for denoting the area of the seed-passages through the hopper-bottom, it being seen that as the area of such seed-passages is determined by the position of the two rotary adjustable valve-plates the lever movable at its free end over the scale will serve to indicate the position of the apertures of the valve-plates, and consequently the areas of the seed-passages, which indication can be predetermined by any arbitrary set of numbers upon the scale. In this way the apparatus can be set for different kinds of grain and the quantity of the discharge controlled.

To permit the lever to be readily operated, and also to maintain it in adjustment, it is provided with a set-screw, I, arranged to pass through a curved slot, $g^4$, formed in the extension part of the hopper-bottom. This set-screw can be taken hold of and used as a handle for swinging the lever, and when desired can be turned, so as to draw the lever up and hold it against the hopper-bottom extension. Said hopper-bottom extension extends and works under a curved plate, $B'$, which is formed with or bolted to the base-plate, and provided with a curved slot, $B^2$, through which a set-screw, K, carried by the hopper-bottom extension, is arranged to pass. This set-screw serves as a handle for conveniently operating the adjustable hopper-bottom, and can be turned so as to draw the hopper-bottom extension, or a boss, $g^5$, Fig. 3, thereon, up against the curved plate $B'$, and thus hold the hopper-bottom securely in its adjustment. The extension $g$ of the hopper-bottom has a fixed pointer, as at $g^6$, and the plate $B'$ has at its middle a mark or fixed pointer, as at $B^3$. When the hopper-bottom is in position to bring the two said pointers into register with each other, it will be known that the adjustable hopper-bottom is in a position between its two extreme right and left positions, in which way the position of the apertures or seed-passages in the hopper-bottom can be readily ascertained. A ring-plate, L, is shown fitted upon the base-plate and arranged to overlap or overhang the adjustable hopper-bottom to some extent, and upon this ring-plate is fitted a second ring, M, the hopper being at its lower edge turned under the ring M and held between the two rings, which are bolted down upon the base-plate.

To prevent seed passing from the discharge-aperture of the base B to the fan from being blown about, a hood, N, is arranged between the said base and the rotary distributing-fan. This hood consists of a short cylindrical shell attached to and depending from the hopper-base B, so as to extend about down to the rotary distributing-fan; also, to prevent seed or the like from being blown about while it is being carried round upon the rotary distributing-fan, the latter is capped or covered by a ring-plate, $C^2$, having its central opening adapted to receive the lower end of the cylindrical hood. This ring-plate is secured upon the rotary distributing-fan in any convenient way—as, for example, the blades or wings of the fan are provided with perforated lugs $c$, for bolts or screws, which may be employed to secure the ring cap-plate in place.

The means herein shown for operating the rotary distributing-fan are nearly the same as in said former application, and need not be particularly described, it being sufficient to observe that a horizontal shaft supported from the end-gate is at one end driven from a sprocket on one of the hind wheels of the wagon by a link-belt, and is at its opposite end provided with a gear-wheel engaging a gear upon the rotary distributing-fan spindle.

The lever P, herein employed for shifting the clutch designed to connect or disconnect the shaft with or from the driving-power, is pivoted to the rear side of the end-gate, and is bent laterally at its lower end, to connect with a yoke-link, Q, which latter is in turn arranged to straddle the sliding member of the clutch.

What we claim as our invention is—

1. In a seeding-machine for sowing broadcast, the rotary distributer arranged below the hopper, in combination with the double valve applied to vary the area of the hopper outlet or outlets, and consisting of two oscilatory adjustable apertured valve-plates movable in opposite directions, and having their apertures disposed to open or close the hopper-discharge outlet or outlets from and toward the center of each opening, substantially as described, whereby a variation in the area of a discharge-outlet shall not shift the point of discharge relatively to the distributer, and means suitable to operate said valve-plates and maintain said relationship of their apertures.

2. In a seeding-machine, the combination, with the rotary distributer and the hopper provided with an adjustable apertured bottom, of a double valve consisting of two oscillatory apertured valve-plates pivoted to the adjustable hopper-bottom, substantially as described.

3. In a seeding-machine, the rotary distributer and the apertured hopper-bottom, in combination with a double valve composed of two double-apertured independent rotary adjustable valve-plates, and means suitable for simultaneously adjusting said valve-plates in opposite directions, substantially as and for the purpose described.

4. The combination, with the hopper provided with an oscillatory adjustable apertured bottom, of the double valve H, comprising two oscillatory double apertured plates, $h$ and $h'$, each having their ports or apertures $h^2$ disposed as set forth, and both pivoted to the hopper-bottom eccentric to the axis about which the latter is arranged to oscillate, substantially as described.

5. The combination, with the rotary distributing-fan, the hopper-base arranged over the fan, and provided with a curved discharge aperture, and the oscillatory adjustable apertured hopper-bottom operative over said apertured hopper-base, of a double valve, substantially as described, pivoted to the hopper-bottom, for the purpose set forth.

6. The two oscillatory adjustable valve-plates pivoted to the hopper-bottom, in combination with the vibratory lever carried by an extension of the hopper-bottom, and means, such as described, connecting the lever with the valve-plates to simultaneously operate the latter in opposite directions, for the purpose set forth.

7. The two valve-plates pivoted to the adjustable apertured hopper-bottom, in combination with the vibratory lever connected with the valve-plates, substantially as described, and an index arranged to serve, in conjunction with the lever, as a means for indicating the position of the valve-plates with reference to the discharge.

8. The combination, with the double valve pivoted to the hopper-bottom, of the valve-operating lever pivoted to an extension of the hopper-bottom, and having its free end extended up through a slot in the same, substantially as described.

9. The hopper-bottom and the double valve pivoted thereto, in combination with the valve-lever pivoted to an extension of the hopper-bottom, and means, substantially as described, for holding the valve-lever in its adjustment.

10. The oscillatory apertured hopper-bottom operative over a slotted base-plate, and provided with an extension, substantially as set forth, in combination with a slotted plate rigid with the base-plate and disposed over the hopper-bottom extension, and a set-screw carried by the hopper-bottom extension and working through the slotted plate over the same, substantially as described.

11. The two valve-plates pivoted to the hopper-bottom, in combination with the valve-lever, links or pitmen connected with the valve-plates, a link connecting said pitmen with the valve-lever, and means, substantially as described, for guiding said link.

12. The apertured hopper-bottom, in combination with the apertured oscillatory valve-plates, the hopper-bottom being provided on its under side with one or more ribs, each extending into an aperture of the upper valve-plate, and the latter being provided with a notch at the side of each aperture to receive one of said ribs when the valve-plates are in position to open the hopper-bottom apertures, substantially as described, and for the purpose set forth.

13. The combination, with the rotary distributer and the hopper, of the hopper-base provided at one end with depending lugs $b$, fitted against one side of the end-gate board, and the brackets E, applied against the opposite side of the end-gate board and upholding the hopper-base, substantially as described.

14. The combination, with the hopper, of the rotary distributer provided with a cap-plate, $C^2$, arranged over and secured to the wings of the rotary distributer, and having a central opening, substantially as set forth.

LLOYD EBERHART.
IRVING D. STEVENS.

Witnesses:
CHAS. G. PAGE,
W. H. YOUNG.